July 6, 1965
G. L. HAZEN
3,193,155
FEEDING OR DISPENSING APPARATUS FOR GROUND, GRANULAR
OR PELLETIZED FEEDS OR THE LIKE
Filed Feb. 28, 1963
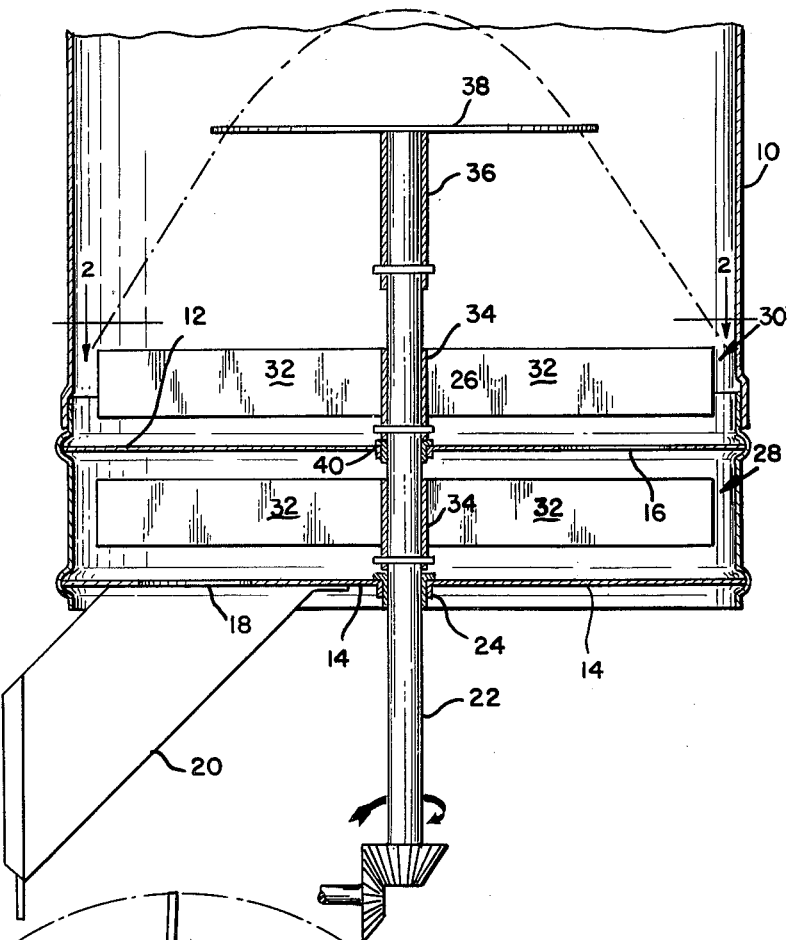
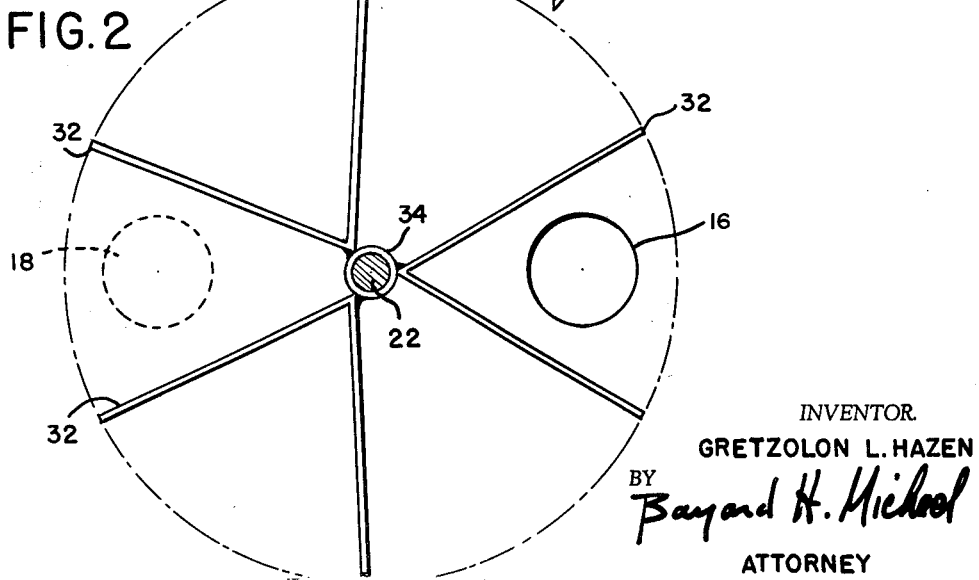
INVENTOR.
GRETZOLON L. HAZEN
BY
Bayard H. Michael
ATTORNEY 3,193,155
FEEDING OR DISPENSING APPARATUS FOR GROUND, GRANULAR OR PELLETIZED FEEDS OR THE LIKE
Gretzolon L. Hazen, Fort Atkinson, Wis., assignor to Dairy Equipment Company, Madison, Wis., a corporation of Wisconsin
Filed Feb. 28, 1963, Ser. No. 261,718
1 Claim. (Cl. 222—227)

This invention relates to feeding or dispensing apparatus for ground, granular or pelletized feeds and the like.

As is well known, the foregoing feeds tend to "bridge" in feed chutes which have horizontal or converging portions allowing the material to start building up until it bridges the chute. When such a bridge has been established removal of material from under the bridge will not break the bridge and feeding through the chute stops. Such a bridge is generally in the form of a conical dome which approximates the complement of the angle of response of the material. Bridging is a very real problem in any supply system where the material is stored in the chute and fed therefrom as needed. There has been no real solution to the problem in the past and when bridging occurred the user generally resorted to pounding on the chute or running a pole down through the feed to break the bridge.

A further problem is encountered when handling pelletized feeds which not only tend to bridge but when the pellets are free they tend to run through the feeding mechanism like water and are uncontrollable unless a positive gate is incorporated.

The principal object of this invention is to provide a feeding or dispensing apparatus which eliminates bridging problems and can effectively handle pelletized feeds as well.

Another object is to provide such apparatus which is simple, inexpensive and has low power requirements.

Other objects and advantages will be pointed out in, or be apparent from, the specification and claims, as will obvious modifications of the single embodiment shown in the drawings, in which:

FIG. 1 is a vertical section through the present apparatus; and

FIG. 2 is a plan view of a star wheel taken as indicated by line 2—2 in FIG. 1.

Feed systems of the type here under discussion are frequently used in barns for supplying feed to the various feeding areas. The chute 10 may extend 10 to 30 feet to another floor in the barn where the feed supplies are kept and these supplies are generally stored so as to feed into the various chutes running down to the cattle floor. If the chute is kept straight and free of obstruction difficulties with bridging along the length of the chute can be avoided. The present chute is fabricated of galvanized stove pipe about 12 inches in diameter although this is not any particular requirement of the system. At the bottom portion of the chute there are two spaced horizontal plates 12, 14, each of which is provided with a hole about four inches in diameter. The hole 16 in plate 12 is about 180 degrees offset from the hole 18 in plate 14. The hole 18 is designed to supply feed to the spout 20. Shaft 22 runs up the center of the plates 12 and 14 through bearings 24, 26 and is adapted for provision of a suitable drive at the lower, exposed end. This can be either a hand drive or a motor drive and, as will be pointed out more fully hereinafter, the power requirements are very low.

So called star wheels 28, 30 are connected to shaft 22 above plates 14 and 12. These star wheels are customary in this type of equipment and merely comprise six spaced vanes 32 welded to a hub 34 which, in turn, is pinned to the shaft for rotation therewith. As both star wheels are rotated feed will fall through hole 16 in plate 12 to fall into the space between the plates whereupon it will be picked up by a vane on the lower star wheel 28 and carried around to drop through hole 18 in the bottom plate for delivery to the spout 20. If the upper star wheel 30 was not provided the feeding from the chute would really occur in a column directly above the hole 16 but by employing the wheel 30 the material over the entire area of the chute can be picked up except for that which must necessarily lie between the ends of the vanes and the inside of the chute 10. This, incidentally, is the cause of the problems in that some clearance must be provided between the tips of the vanes 32 and the chute. If the clearance is too small the feed can jam between the tip and the chute and stall the feeding mechanism. Therefore, adequate clearance must be provided at this point and this, therefore, leaves what amounts to an annular obstructed area equivalent to the clearance between the vane tip and the inside of the chute and it is at this point that the feed can start to build up for bridging. Thus, the material can get compacted in an annular form until it rises above the top of the vanes 32 and it will then tend to follow the dotted line representation in the drawing which generally indicates the bridging angle, or dome form, that bridging will take. Then, without the added apparatus to be described hereinafter, when the feed mechanism is started up the upper star wheel 30 will clear out the material underneath and inside of this dotted line whereupon the bridge operates to prevent further feeding and the apparatus has been rendered ineffectual.

To overcome this bridging problem I have extended the shaft 22 upwardly above the top star wheel 30 to connect with hub 36 on which a flat circular disc 38 is mounted. This disc should be vertically spaced by a lineal dimension which should be less than a normal bridging height of the material being handled so that the disc will, in effect, interrupt the normal bridging of the material. This can be seen in FIG. 1 where it will be seen that the disc extends laterally beyond the dotted lines and, thus, breaks into the bridging angle of the feed. Therefore, with the present apparatus when the feeding mechanism is started up the rotating disc 38 interrupts the bridge which has presumably tended to be established during the static phase and the material will, therefore, readily feed down with no difficulty.

The only other dimensional consideration to be borne in mind in the present apparatus is that the peripheral clearance between the disc and the inside of the chute should be kept greater than that clearance which would allow bridging to start at this point. Thus, if the disc is increased in diameter to substantially reduce this clearance there is a strong likelihood that bridging will start at this obstructed area and all that would be accomplished would be to move the point of bridging up the chute some distance. At first consideration of this apparatus one would feel that any feed lying on top of the disc would tend to stay there while material was fed down around the sides of the disc. Experiments using colored feed indicate that this is not so and that the material in contact with the surface of the disc is constantly changing. One would also feel that the weight of the column of feed would subject the disc to severe loading but experience shows that this is not so and that the simple washer 40 serves as an adequate thrust bearing. The reason that the material does not exert much downward force is that, again, the angle of bridging or tendency to bridge results in a considerable lateral thrust and very little downward thrust. The disc does serve to relieve the loading on the star wheel 30 so even the starting torque requirements are very low even though at the bottom of a 10 to 30 foot column of feed. The power requirements of this system are so low that in the motorized version a 1/500 horsepower motor can be used to drive the apparatus. Since the disc is flat it will be appreciated that virtually no torque is required to rotate the disc.

A further point of interest in this apparatus is that even with the fine pelletized feeds there is no tendency for the pellets to run right through the two offset holes 16, 18 in the plates 12, 14. Thus, in feeders employing two star wheels as here illustrated but without the disc 38 there have been instances where once the feeding started it would continue even though the drive of the star wheels was stopped. Apparently the provision of the disc disturbs the flow pattern coming into the upper hole 16 sufficiently so that this uncontrollable feeding of the pellets is avoided. The disc is effective in breaking up the bridging tendency of pelletized feeds just as with ground feeds and the like.

In the foregoing description it was mentioned that the vertical spacing of the disc 38 must be such as to interrupt the normal bridging angle of the material in the chute and this vertical spacing may be taken from the upper plate 12 in some instances or from some point above the upper plate 12 where the bridging can start as, for example, at the plane of the upper edge of the vanes 32 on the upper star wheel 30. Thus, the important thing is not to find the height of the bridging and then put the disc in the system a vertical distance less than that height above the plate, but it is to determine the actual bridging characteristics in the particular system which will be determined by the peripheral clearance between the star wheel and the chute as well as other factors. It will be appreciated that if the vertical spacing of the disc is reduced the diameter of the disc must be increased and this, then, runs into possible problems with respect to creating a bridging problem by reason of too small a clearance between the disc and the inside of the chute.

Although but one embodiment of the present invention has been illustrated and described, it will be apparent to those skilled in the art that various changes and modifications may be made therein without departing from the spirit of the invention or from the scope of the appended claim.

Other shapes can be used in lieu of the flat disc but the disc is effective and cheap so no need is seen for more expensive conical shapes or the like.

I claim:

Feeding or dispensing apparatus for ground, granular or pelletized feeds comprising:

a substantially vertically extending chute;

dispensing means mounted at the bottom of the chute for dispensing feed from the chute, said dispensing means including a pair of vertically spaced plates horizontally extending across the chute and fastened thereto and having misaligned holes therein, said dispensing means further including a vane mounted above each plate, said vanes rotatably mounted on a shaft with the peripheral extremities of said vanes being spaced from the chute a sufficient distance to prevent jamming of feed between said vanes and said chute, said shaft extending through said spaced plate and rotatably mounted therein;

a horizontally disposed flat disc rotatably mounted on said shaft above said dispensing means to interrupt the normal bridging angle of feed in the chute, the diameter of said disc being sufficient to support a substantial portion of the weight of the column of material above said disc and yet spaced from the chute a sufficient distance to prevent bridging at the disc; and drive means operatively connected to said shaft for rotating said vanes and said disc.

References Cited by the Examiner

UNITED STATES PATENTS

| | | | |
|---|---|---|---|
| 1,286,223 | 12/18 | Bunnell | 222—239 |
| 1,291,759 | 1/19 | Bunnell | 222—239 X |
| 1,294,187 | 2/19 | Steiner et al. | 222—239 |
| 1,394,908 | 10/21 | Kelling | 222—564 X |
| 1,966,326 | 7/34 | Wentorf | 222—239 X |
| 2,336,181 | 12/43 | Lower | 222—236 X |
| 2,641,384 | 6/53 | Mateer | 222—241 X |

FOREIGN PATENTS

| | | |
|---|---|---|
| 714,790 | 9/54 | Great Britain. |
| 1,233,718 | 10/60 | France. |

LOUIS J. DEMBO, *Primary Examiner.*

RAPHAEL M. LUPO, *Examiner.*